United States Patent [19]

Jenkins

[11] 4,063,628

[45] Dec. 20, 1977

[54] LEVELING DISCHARGE SYSTEM FOR READY-MIX TRUCKS

[76] Inventor: Eugene Michael Jenkins, 206 E. Camina Colegio, Santa Maria, Calif. 93454

[21] Appl. No.: 735,823

[22] Filed: Oct. 26, 1976

[51] Int. Cl.[2] ........................ B65G 11/12; B65G 11/18

[52] U.S. Cl. .......................................... 193/10; 193/16

[58] Field of Search ........................ 193/4, 5, 6, 10, 14, 193/16, 17, 23; 198/317, 318, 319, 535, 536; 214/83.26, 509, 520, 521, 522, 700; 259/172; 298/7; 280/6 R, 6 H; 180/41

[56] References Cited

U.S. PATENT DOCUMENTS

| | | | |
|---|---|---|---|
| 2,717,769 | 9/1955 | Masek | 193/10 X |
| 2,968,382 | 1/1961 | Oury | 193/10 |
| 3,402,805 | 9/1968 | Spellman | 198/317 X |
| 3,652,101 | 3/1972 | Pivonka | 280/6 H X |
| 3,774,741 | 11/1973 | Johnson | 193/10 |
| 3,863,783 | 2/1975 | Spellman | 214/83.26 |

*Primary Examiner*—Johnny D. Cherry
*Assistant Examiner*—James L. Rowland
*Attorney, Agent, or Firm*—Huebner & Worrel

[57] ABSTRACT

A leveling discharge system for ready-mix concrete trucks having a first member mounted on a truck for pivotal movement about a substantially horizontal first axis disposed longitudinally of the truck, a second member mounted on the first member for pivotal movement about a substantially erect second axis disposed in a plane common to the first axis, and a discharge chute mounted on the second member for pivotal movement about a substantially horizontal third axis normal to said plane and disposed transversely of the truck.

9 Claims, 8 Drawing Figures

LEVELING DISCHARGE SYSTEM FOR READY-MIX TRUCKS

BACKGROUND OF THE INVENTION

1. Field of the invention

The present invention relates to a leveling discharge system, and more particularly to such a system for a ready-mix concrete truck which enables the discharge end of a discharge chute thereof to swing transversely of the truck about a vertically maintained axis independently of tipping of the truck.

2. Description of the Prior Art

Existing discharge chutes for ready-mix concrete trucks are adapted to swing transversely of their trucks for distribution of concrete from side to side about preferably upright axes at the mounting ends of such chutes. These axes are vertical when the trucks are transversely leveled, but when, as is frequently necessary, a truck is positioned with a transverse inclination while discharging concrete, the axis is no longer vertical, and the discharge end of the chute is higher when swung to one side of the truck than when swung to the opposite side thereof. This difference in elevation is not only inconvenient because of the possibilities of the chute engaging the surface to be poured at the low side and the splashing of liquid concrete at the high side, but even under relatively favorable conditions this difference in elevation requires raising the heavy concrete filled chute by manual effort as it is swung toward the high side and manually restraining the return of the chute to the low side. This effort required to position the chute frequently requires two or more men, involves great hazard, is inexact, frequently results in the discharge of concrete where it is not wanted, wastes concrete and has for many years been recognized as a serious problem in the delivery of ready-mix concrete and the like where the terrain is not absolutely level.

Existing ready-mix trucks often have the discharge end of the chute elevated or lowered hydraulically so that as the chute is manually swung toward the "high side", the discharge end can be simultaneously lowered relative to the truck so that the discharge end will swing horizontally. While this procedure does reduce the effort somewhat, greater effort and care are required than when pouring on level ground because of the difficulty of synchronizing the elevational movement of the chute with the transverse swinging movement thereof. Even if the effort were reduced to that required on level ground, it would still be necessary to provide an additional man to control the elevation of the chute.

The difficulties arising from varying elevations of the discharge chute of a ready-mix truck which is not transversely leveled as the chute is swung from side to side are, of course, even greater when the truck is moving over an irregular surface while pouring is attempted.

SUMMARY OF THE INVENTION

Accordingly, it is an object of the present invention to provide a discharge leveling system for the discharge chutes of ready-mix concrete trucks which will permit the discharge end of such a chute to swing in a horizontal plane even though the truck itself is not level.

Another object is to provide such a system which permits the accurate positioning and control of the discharge chutes of ready-mix trucks even on terrain which is not level.

Another object is to provide such a system which will enable the arcuately positioned discharge of concrete from a truck by one person under such adverse circumstances.

Another object is to provide such a system which will facilitate rapid pouring of concrete from a ready-mix truck while such a truck traverses an uneven ground surface.

Another object is to provide such a system which will automatically adapt itself to varying transverse inclinations of the truck.

Another object is to provide such a system which is readily adaptable to existing ready-mix trucks.

A further object is to provide such a system which is sufficiently rugged for use in the construction industry.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figures 1, 2:
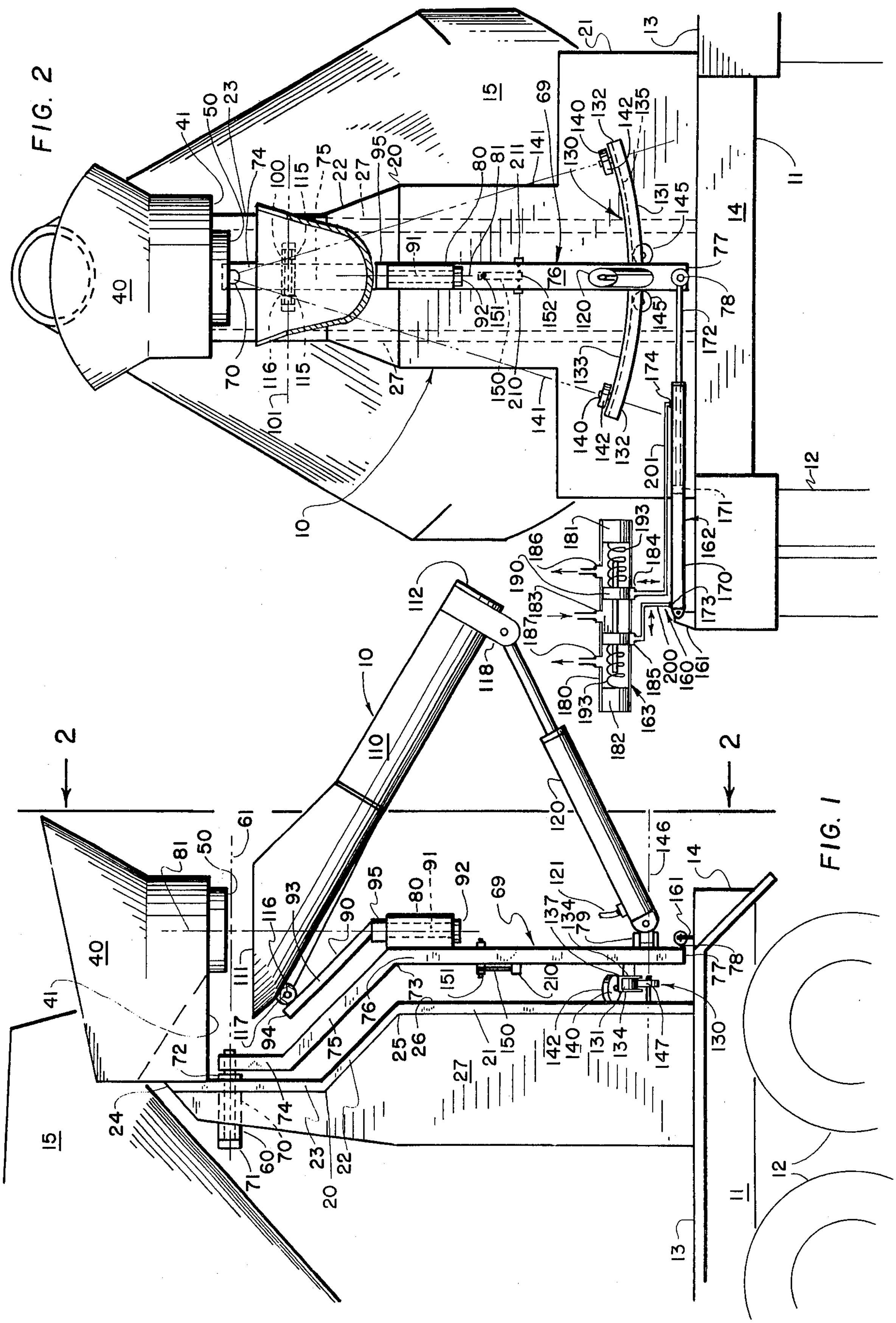
FIG. 1 is a side elevation of a chute leveling discharge system for a ready-mix concrete truck embodying the princicples of the present invention, with a truck fragmentarily represented.
FIG. 2 is a vertical section of the leveling system of FIG. 1 taken on line 2—2 of FIG. 1 including a schematic diagram of an electrically actuated hydraulic control valve used in the system.

Referring more particularly to the drawings, in FIGS. 1 and 2 there is shown a leveling discharge system, indicated generally by the numeral 10. The leveling discharge system is shown mounted on a fragmentarily represented rearward portion of the frame 11 of such a truck having a longitudinal axis and mounted for ground traversing movement on wheels 12. The rearward portion of the frame 11 has an upwardly disposed surface 13 and a rearwardly disposed transverse surface 14. The truck has a conventional transporting and mixing hopper 15, for concrete or other flowable material and which is fragmentarily represented. As is well known, the hopper is rotated to mix and to dump the contents thereof.

A transversely disposed backing plate 20 is fixed to the rearward portion of the truck frame 11 and includes a vertical lower portion 21 extending upwardly from the truck frame to a central portion 22 which extends forwardly and upwardly from the lower portion to a vertical upper portion 23, which, in turn, extends upwardly from the central portion to the upper edge 24 of the backing plate. The backing plate 20 has a forwardly disposed surface 25 and a rearwardly disposed surface 26. A plurality of vertical, longitudinally disposed stiffening plates 27 are fixed at their rearward edges to the forwardly disposed surface 25 of the backing plate and are fixed at their lower edges to the upwardly disposed surface 13 of the rearward portion 11 of the truck frame. A horizontal, rearwardly extending funnel or trough 40 is fixed toward the upper edge 24 of the backing plate 20 and is adapted to receive concrete or other flowable material from the transporting hopper 15 when it is dumped in the well known manner. The trough has a bottom 41 having a circular discharge opening 50. A first bearing 60 having a substantially horizontal, longitudinal axis 61 bisecting the opening 50 and closely adjacent therebelow is fixed to the backing plate 20 and extends forwardly therefrom.

A first element, indicated generally by the numeral 69, is mounted on the backing plate for pivotal movement relative thereto about the longitudinal axis 61 of the first bearing 60. The first element has a horizontal, longitudinal shaft 70 received for pivotal movement in the bearing 60. The shaft 70 extends through the bearing 60 and is retained in the bearing by a nut 71 screw threaded on the forward end of the shaft 70 and a stop collar 72 mounted on the rearward end of the shaft for bearing engagement. The rearward end of the shaft 70 is rigidly connected to a beam 73 which extends generally downwardly from the shaft. The beam has a vertical upper portion 74, an inclined central portion 75, and a vertical lower portion 76 which correspond to and are substantially parallel, respectively, to the upper portion 23, central portion 22, and lower portion 21 respectively of the backing plate 20. The vertical lower portion 76 of the beam 73 terminates at a lower end 77 of the first element closely adjacent to the upwardly disposed surface 13 of the rearward portion of the truck frame 11. A horizontal, mounting pin 78 is mounted on the lower portion 76 of the beam adjacent to the lower end 77 thereof and extends rearwardly therefrom for purposes subsequently to be described. A swivel coupling 79 permitting pivotal movement about a substantially vertical axis and about a substantially horizontal axis is mounted on said lower portion of the beam upwardly adjacent to the mounting pin 78 and rearwardly disposed from the beam.

A second bearing 80 is mounted on the lower vertical portion 76 of the beam 73 adjacent to and extending downwardly from the junction of the lower portion 76 of the beam 73 with its inclined central portion 75. The bearing 80 has a substantially erect axis 81 intersecting the horizontal axis 61 in substantially right angular relation thereto and preferably extending substantially centrally through the discharge opening 50. A second element, indicated generally by the numeral 90, is mounted on the first element 69 for pivotal movement relative thereto about the axis 81 of the second bearing 80. The second element has a vertical shaft 91 received for pivotal movement in the bearing 80. The shaft 91 extends through the bearing 80 and is retained therein by a nut 92 screw threaded on the lower end of the shaft. The upper end of the shaft 91 is connected to an arm 93 extending upwardly and rearwardly from the shaft 91 in a position above and generally parallel to the inclined central portion 75 of the beam 73 of the first element 69. The arm 93 extends from the shaft 91 to an upper end portion adjacent to the vertical upper portion 74 of the beam 73. A stop collar 95 is provided on the shaft 91 for rested engagement on the bearing 80 to preclude downward movement of the shaft. A third bearing 100 is mounted on the upper end portion 94 of the arm 93 and has a substantially horizontal axis 101 transversely related to both the axes 61 and 81.

A discharge chute 110 is mounted on the arm 93 of the second element 90 for pivotal movement relative thereto about the horizontal axis 101 of the bearing 100. The discharge chute has a receiving end 111 disposed below the discharge opening 50 in the trough 40 and preferably below the horizontal axis 61 of the first bearing 60. The discharge chute extends rearwardly from its receiving end to a distal discharge end 112. A pair of cylindrical sleeves 115 are mounted on the lower side of the receiving portion of the discharge chute laterally opposite to the third cylindrical bearing 100 on the second element 90 in axial alignment with said third bearing. A pin 116 extends through the sleeves 115 and bearing 100 for pivotal mounting of the chute for elevational movement on the second element. The pin 116 is retained in the sleeves by a pair of nuts 117 at opposite ends of the pin.

A clevis coupling 118 is mounted on the discharge chute 110 toward the distal end 112 thereof and downwardly disposed therefrom. The leveling discharge system 10 includes a chute elevating, contractible and extensible, hydraulic ram 120 having an end connected to the clevis coupling 118 and an opposite end connected to the swivel coupling 79 on the lower end 77 of the beam 73 of the first element 69. The ram 120 is provided with a connection 121 to a hydraulic system, not shown but well known in the art, for contracting or extending the ram for vertical positioning of the distal end 112 of the discharge chute 110 and bracing the chute in a desired attitude.

The leveling discharge system 10 has a thrust transfer assembly, indicated generally by the numeral 130, interconnecting the vertical lower portions 21 and 76, respectively, of the backing plate 20 and the beam 73 of the first element 69. The thrust assembly includes an arcuate channel member 131 longitudinally positioned between the lower vertical portions 21 and 76, respectively, of the backing plate 20 and the beam 73. The channel member 131 has an inverted U-shaped cross section formed by a back 133 and legs 134 extending longitudinally oppositely downwardly therefrom. The back 133 of the channel has a downwardly disposed, arcuate surface 135 between the legs 134. A pair of first rollers 140 are individually mounted on the channel member 131 toward the transversely opposite ends 132 thereof. The first rollers 140 are mounted for rotational movement about individual axes 141 radially related to the horizontal axis 61 about which the channel member is concentrically curved. The peripheries 142 of the first rollers 140 engage the rearwardly disposed surface of the vertical lower portion 21 of the backing plate 20 for transmission of forwardly directed longitudinal thrust thereto.

The thrust assembly also includes a pair of second rollers 145 mounted on the lower portion of the backing plate 20 for rotational movement about individual horizontal, longitudinal axes 146. The axes 146 are disposed below and in spaced relation with the arcuate channel member 131, and are disposed transversely oppositely of the longitudinal, horizontal axis 61 of the first bearing 60. The second rollers 145 are longitudinally positioned between the legs 134 of the channel member, and the peripheries 147 of said rollers engages the downwardly disposed arcuate surface 135 of the back 133 of the channel member 131 for transmission of downwardly directed loads to the rollers from the channel member.

A pendulum 150 having an upper end 151 and a lower end 152 is pivotally mounted at said upper end on the first element 69 for movement in a plane disposed transversely of the truck. The pendulum 150 is preferably connected to the vertical lower portion 76 of the beam 73 between said lower portion and the backing plate 21 upwardly of the thrust transfer assembly 130.

The leveling discharge system 10 is provided with a hydraulic positioning system, indicated generally by the numeral 160 and best shown in FIG. 2, having a mounting lug 161 fixed to the upwardly disposed surface 13 of the rearward portion 11 of the truck frame laterally of the mounting pin 78 on the lower portion 76 of the beam 73; a contractible and expansible hydraulic ram, indicated generally by the numeral 162, having opposite ends pivotally connected, respectively, to the mounting lug 161 and to the mounting pin 78 on the beam 73 of the first element 69; and an electric solenoid actuated hydraulic valve unit, indicated generally by the numeral 163, mounted on the backing plate 20.

The hydraulic ram 162 is of a type well known in the art and includes a cylinder 170 having one end pivotally connected to the lug 161 and having an opposite end disposed toward the mounting pin 78 of the first element 69, a piston 171, indicated by dashed lines in FIG. 2, internally fitted to the cylinder, and a piston rod 172 having an end connected to the piston and extending therefrom through the opposite end of the cylinder to an opposite end of said rod pivotally connected to the mounting pin 78. Hydraulic connections 173 and 174 are provided to the cylinder at, respectively, the end of the cylinder connected to the lug 161 and to the opposite end of the cylinder for fluid delivery to and return from the cylinder.

The electric solenoid actuated hydraulic valve unit 163, as shown in FIG. 2, includes a horizontal cylinder 180 having a closed end disposed toward the first element 69 provided with an electric solenoid 181 and having an opposite closed end provided with an electric solenoid 182. The cylinder 180 has a centrally disposed fluid supply port 183; a pair of hydraulic ram connection ports 184 and 185 disposed oppositely outwardly of the central fluid supply port 183 with the port 184 disposed toward the solenoid 181 and the port 185 disposed toward the solenoid 182; and a pair of fluid discharge ports 186 and 187, respectively, oppositely outwardly disposed from the ram connections 184 and 185. A spool valve 190 is fitted internally to the cylinder 180 and has a central position in which the ram connection ports 184 and 185 are closed and opposite lateral positions disposed, respectively, toward the solenoids 181 and 182. When the spool valve 190 is in the position disposed toward the solenoid 181, fluid connection is established between the fluid supply port 183 and the ram connection port 184 and also established between the ports 185 and 187. Similarly, when said valve is in the position disposed toward the solenoid 182 fluid connection is established between the ports 183 and 185 and also established between the ports 184 and 186. The spool valve 190 is urged toward its central position by a pair of springs 193 disposed at the opposite ends of said valve, and is drawn toward its opposite lateral positions disposed toward the solenoids 181 and 182 by electrically energizing the respective solenoid.

A hydraulic conduit 200 interconnects the port 185 of the hydraulic valve unit 163 and the connection 173 of the cylinder 170 of the hydraulic ram, and a hydraulic conduit 201 interconnects, similarly, the port 184 and the connection 174. The hydraulic connections established by the conduits 200 and 201 adapt the hydraulic positioning system 160 for movement, as viewed in FIG. 2, of the first element 69 in a direction from an electrically energized solenoid 181 or 182 toward the oppositely unenergized solenoid.

Figure 7:
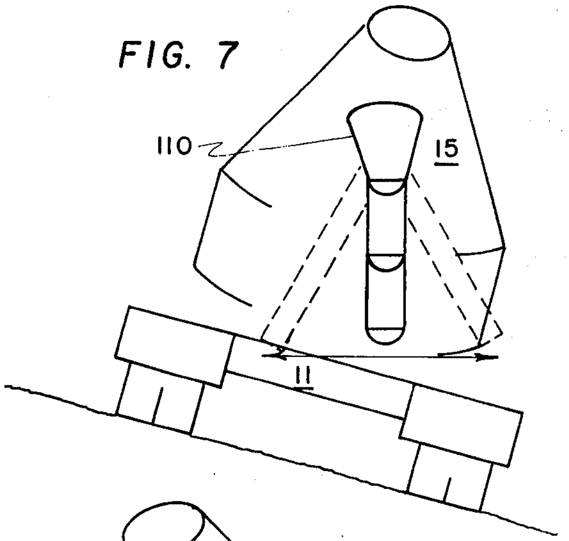
FIG. 7 is a simplified schematic rear elevation of the ready-mix concrete truck of FIG. 6 with the truck transversely tipped to the right, showing the path of the discharge end.
Figure 8:
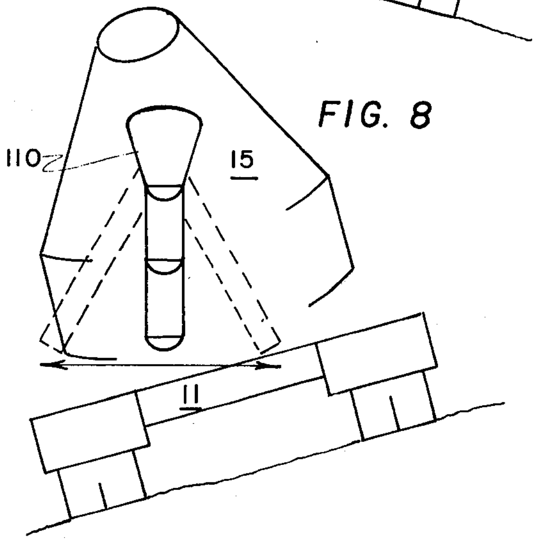
FIG. 8 is a simplified schematic rear elevation of the ready-mix truck of FIG. 6 with the truck transversely tipped to the left, showing the path of the discharge end.

A pair of electric switches 210 and 211 are mounted, as viewed in FIG. 2, on the vertical lower portion 76 of the beam 73 of the first element 69 on laterally opposite sides of the lower end 152 of the pendulum 150 and are adapted to be electrically closed by engagement with said lower end. The switch 210 is mounted on the side of the pendulum disposed toward the hydraulic ram 162, and the switch 211 is mounted on the side of the pendulum disposed away from the hydraulic ram. The switch 210 is electrically connected to energize the solenoid 181 disposed toward the first element 69, and the switch 211 is connected to energize the opposite solenoid 182. These electrical connections adapt the discharge leveling system 10, as shown in FIG. 2, so that, as shown in FIG. 8, the right side of the rearward portion of the truck frame is elevated above the left side thereof the following sequence of operations results: The lower end of the pendulum engages the switch 210, closing it and thereby energizing the solenoid 181 which causes the spool valve 190 to move into its lateral position toward the solenoid 181. In this position the port 184 is hydraulically connected to the fluid supply port 183 and the port 185 is hydraulically connected to the discharge port 187. Fluid under pressure is supplied from the port 184 through the hydraulic conduit 201 to the connection 174 of the cylinder 170 of the hydraulic ram 162, causing the piston 171 and the first element connected therewith to be urged to the left. As the piston moves to the left, fluid escapes from the cylinder 170 through the connections 173, the conduit 200, and the port 185 to the discharge port 187. This contracting movement of the hydraulic ram continues until the first element 69 becomes substantially vertical so that the pendulum disengages the switch 210, opening it and de-energizing the solenoid 181 which allows the spool valve 190 to be urged by the springs 193 into its central position in which the ports 184 and 185 are closed and fluid is trapped on both sides of the piston 171 maintaining the first element in its substantially vertical position. Similarly, inclination of the truck frame in the opposite direction, as shown in FIG. 7, causes the making of electric and hydraulic connections oppositely of those previously described, extending the hydraulic ram vertically to position the first element 69.

It is to be understood that the invention is not limited to the particular arrangement of electrical and hydraulic elements described. For example, extension and contraction of the hydraulic ram 162 could be controlled by a manually actuated hydraulic valve unit, not shown, vertically to position the first element 69 according to visual observation thereof or as needed properly to position the chute 110.

OPERATION

Figure 3:
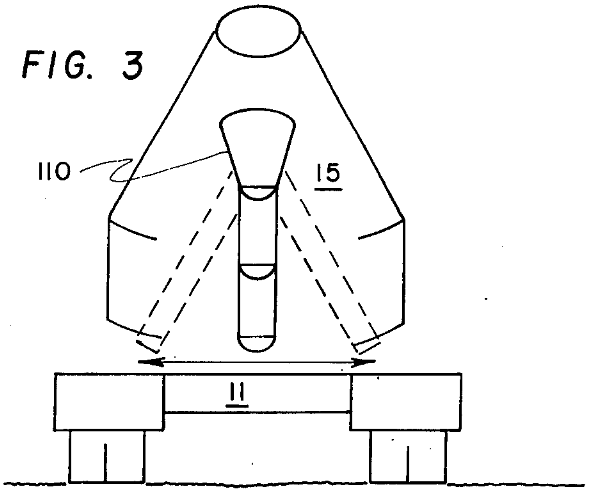
FIG. 3 is a simplified, schematic rear elevation of a conventional ready-mix concrete truck with the truck transversely leveled, showing the path of a discharge end of a chute as the chute is swung transversely of the truck.
Figure 6:
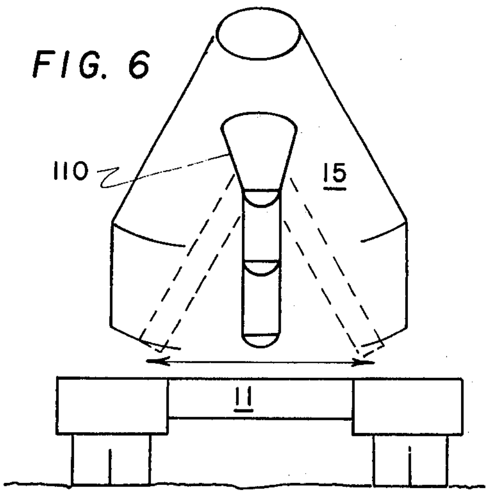
FIG. 6 is a simplified schematic rear elevation of a transversely leveled ready-mix concrete truck provided with a chute leveling system embodying the principles of the present invention showing the path of the discharge end of the chute as it is swung transversely of the truck.

The operation of the described embodiment of the present invention is believed to be clearly apparent and is briefly summarized at this point. The hopper 15 of a ready-mix truck on which the leveling discharge system 10 of the present invention is mounted is supplied with a fresh mix of concrete, and the truck is driven to the sight at which the concrete is to be poured. If the sight is level, as in FIG. 3 in which a conventional ready-mix truck is depicted and in FIG. 6 in which a ready-mix truck with the present invention mounted thereon is depicted, the axis 81 about which the distal end 112 of the discharge chute 110 transversely swings is substantially vertical, and the distal end swings in an arc in a horizontal plane so that no problems arise due to variation of the distance from the distal end to the location where the concrete is being placed. This situation will exist, of course, with the conventional ready-mix truck as well as with a truck provided with the present invention so long as the conventional truck can be leveled transversely during a pour.

Figure 4:
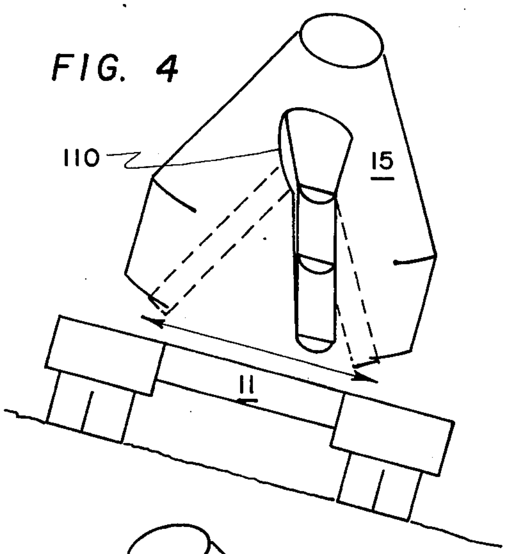
FIG. 4 is a simplified schematic rear elevation of the conventional truck of FIG. 3 with the truck transversely tipped to the right, showing the path of the discharge end.
Figure 5:
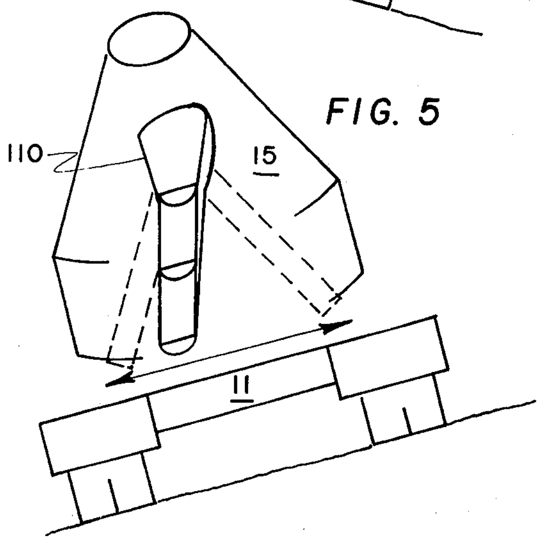
FIG. 5 is a simplified schematic rear elevation of the conventional truck of FIG. 3 with the truck transversely tipped to the left, showing the path of the discharge end.

If, however, as is frequently the case, the sight at which concrete is being poured is uneven and the ready-mix truck cannot be leveled transversely, with the conventional ready-mix truck, as shown in FIGS. 4 and 5, the distal end 112 of the discharge chute 110 rises and falls as the chute is swung transversely to distribute the concrete being poured. This frequently results in the chute being unmanageable. In contrast, if a ready-mix truck mounting a leveling discharge system 10 of the present invention is employed, the axis 81 about which the chute swings is maintained in a vertical position by pivotal movement of the first element 69 about the horizontal axis 61, and the distal end 112 of the chute swings in a horizontal arc, as shown in FIGS. 7 and 8, above the location where the concrete is poured.

The distance of the distal end of the chute 110 above the pouring location can be selected by extending or contracting the hydraulic ram 120 to pivot the chute about the transverse horizontal axis 101. Since the longitudinal, horizontal axis 61 bisects the opening 50 and the erect axis 81 is positioned centrally of said opening, the receiving end 111 of the chute is continuously positioned below the opening 50 for reception of concrete flowing therethrough despite movement about said axes of the elements of the leveling discharge system relative to each other.

Since the hydraulic positioning system 160 is automatically controlled by pivotal movement of the pendulum 150 relative to the first element 69, the discharge chute 110 of a ready-mix truck mounting a leveling discharge system 10 of the present invention is continuously positioned so that the distal end 112 of the chute will swing in a horizontal arc as the truck is moved while continuously pouring concrete. Thus, it will be seen that the system is equally effective whether the truck is stationary or traveling when its load is discharged. Although the invention has been herein shown and described in what is conceived to be the most practical and preferred embodiment, it is recognized that departures may be made therefrom within the scope of the invention, which is not to be limited to the illustrative details disclosed.

Having shown and described my invention what I claim as new and desire to secure by Letters Patent is:

1. In combination with a truck having a transporting hopper for flowable material and an opening through which such material can be discharged, a leveling discharge system comprising:

A. a first element mounted on the truck for pivotal movement about a substantially horizontal axis disposed longitudinally of the truck and downwardly extended from said axis;

B. a second element mounted on said first element for pivotal movement about a substantially erect axis below said horizontal longitudinal axis and in substantially right angular relation thereto; and C. a chute having a receiving end and a distal end, said chute being disposed below the opening and mounted on the second element for pivotal movement about a substantially horizontal axis disposed transversely of the truck, said horizontal transverse axis being below the horizontal longitudinal axis.

2. The combination of claim 1 in which the substantially erect axis is substantially vertically aligned with the opening through which the flowable material is discharged whatever its pivotal position about the substantially erect axis.

3. The combination of claim 1 including a plate rigidly mounted on the truck in a substantially erect plane transversely of the truck forwardly adjacent to said first element; and a plurality of rollers mounted on the first element in rolling engagement with the plate having axes substantially radially related to the horizontal longitudinal axis.

4. The combination of claim 1 including an arcuate track rigidly mounted on the truck substantially concentrically of the horizontal longitudinal axis; and a plurality of rollers mounted on the first element in rolling engagement with the track having axes substantially parallel to the horizontal longitudinal axis.

5. A leveling discharge system for a ready-mix truck having a mixing hopper and a discharge opening comprising:

A. a first element pivotally mounted on the truck adjacent to the opening for movement about a substantially horizontal first axis disposed longitudinally of the truck and bisecting said opening, said element being downwardly extended from said axis;

B. a second element pivotally mounted on said first element below said first axis for movement about a substantially erect axis intersecting said horizontal axis; and C. a chute having a receiving end disposed below said opening and below the horizontal axis pivotally mounted on the second element for movement about a second substantially horizontal axis transversely related to both the horizontal and the erect axes and being below the first horizontal axis, the erect axis being substantially vertically aligned with the discharge opening of the hopper.

6. The leveling discharge system of claim 5 having means mounted on the truck engageable with the first element in spaced relation to the horizontal axis thereof to resist thrust on said element longitudinally of the truck.

7. A leveling discharge system for a ready-mix truck having a mixing hopper and a discharge opening comprising:

A. a first element pivotally mounted on the truck adjacent to the opening for movement about a substantially horizontal axis disposed longitudinally of the truck and bisecting said opening:

B. a second element pivotally mounted on said first element below said horizontal axis for movement about a substantially erect axis intersecting said horizontal axis;

C. a chute having a receiving end disposed below said opening and below the horizontal axis pivotally mounted on the second element for movement about a substantially horizontal axis transversely related to both the horizontal and the erect axes;

D. a plurality of rollers mounted on the first element having individual axes substantially radially disposed to the horizontal axis of the first element engaging a vertical, transversely disposed plate mounted on the truck; and E. a plurality of rollers mounted on the truck having individual longitudinal axes engaging a downwardly disposed arcuate surface mounted on said first element and curved substantially concentrically about the horizontal axis of the first element.

8. A leveling discharge system, for a ready-mix truck having a mixing hopper and a discharge opening for discharge of contents of the hopper therethrough, comprising:

A. a first element pivotally mounted on the truck adjacent to the opening for movement about a substantially horizontal axis disposed longitudinally of the truck and bisecting said opening, said first element being downwardly extended from said axis;

B. a trough mounted on said first element having a receiving end beneath the discharge opening to receive contents of the hopper and a distal discharge end; and C. means for resisting displacement of the downwardly extended first element by the weight of the trough and contents of the hopper received by the trough, said means comprising:

1. a plurality of rollers mounted on one of said truck and first element in spaced relation to said horizontal axis having individual axes substantially radially related to said horizontal axis, and
2. means rigidly mounted on the other of said truck and first element having the rollers in rolling engagement therewith.

9. The leveling discharge system of claim 8 in which the means for resisting displacement of the first element includes an arcuate track rigidly mounted on one of said truck and first element substantially concentrically to said horizontal axis, and rollers mounted on the other of said truck and first element in rolling engagement with the track, said rollers having individual axes substantially parallel to said horizontal axis and substantially equally spaced therefrom.

* * * * *